(12) United States Patent
Postrel

(10) Patent No.: US 8,195,507 B2
(45) Date of Patent: *Jun. 5, 2012

(54) METHOD AND SYSTEM FOR USING MULTI-FUNCTION CARDS FOR STORING, MANAGING AND AGGREGATING REWARD POINTS

(75) Inventor: Richard Postrel, Miami Beach, FL (US)

(73) Assignee: Signature Systems, LLC., Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,505

(22) Filed: Mar. 18, 2010

(65) Prior Publication Data

US 2010/0223118 A1    Sep. 2, 2010

Related U.S. Application Data

(63) Continuation of application No. 10/835,547, filed on Apr. 28, 2004, now Pat. No. 7,716,080, which is a continuation-in-part of application No. 10/608,736, filed on Jun. 27, 2003, now Pat. No. 6,820,061, which is a continuation of application No. 09/602,222, filed on Jun. 23, 2000, now Pat. No. 6,594,640.

(60) Provisional application No. 60/140,603, filed on Jun. 23, 1999.

(51) Int. Cl.
*G06Q 40/00* (2012.01)
(52) U.S. Cl. ................ 705/14; 705/35; 705/41
(58) Field of Classification Search ............ 705/14, 705/41, 35
See application file for complete search history.

(56) References Cited

U.S. PATENT DOCUMENTS

| | | | | |
|---|---|---|---|---|
| 5,649,118 A | * | 7/1997 | Carlisle et al. | 705/41 |
| 5,806,045 A | * | 9/1998 | Biorge et al. | 705/14.17 |
| 5,992,738 A | * | 11/1999 | Matsumoto et al. | 235/381 |
| 6,061,660 A | * | 5/2000 | Eggleston et al. | 705/14.12 |
| 6,776,332 B2 | * | 8/2004 | Allen et al. | 235/380 |
| 6,965,868 B1 | * | 11/2005 | Bednarek | 705/7.14 |
| 2002/0062249 A1 | * | 5/2002 | Iannacci | 705/14 |
| 2002/0128916 A1 | * | 9/2002 | Beinecke, III | 705/26 |
| 2003/0115137 A1 | * | 6/2003 | Rowe | 705/39 |

OTHER PUBLICATIONS

Information about the MyPoints TM Program retrieved on Jan. 2008 from Internet http ://www.mypoints.com>, herein referred to as MyPoints TM Program web site. This web site was archived by web.archive.org on Jul. 5, 1998.*
Hein, Kenneth. (Jul. 1996). What's the deal? Incentive, 170(7), 63. Retrieved Apr. 16, 2012.*

* cited by examiner

*Primary Examiner* — Kito R Robinson
(74) *Attorney, Agent, or Firm* — Barkume & Associates, P.C.

(57) ABSTRACT

A system and method for operating a reward points accumulation and redemption program wherein a user earns reward points from a plurality of independent reward points issuing entities, with each tracking the user's earned reward points in a user reward point account stored on a multi-function card (such as a frequent flyer account or a credit card loyalty account). The multi-function card is adapted to aggregate some or all of the user's earned reward points from the reward accounts and credit the aggregated points into a single reward exchange account on the multi-function card. The user may then select an item for purchase with the accumulated reward points from the multi-function card. The item is provided to the user in exchange for a subset or all of the reward points from the multi-function card.

18 Claims, 9 Drawing Sheets

FIG. 11

Account: John Doe
Account Number: 123456789
Enrollment Date: 12-21-1995
Privilege Card Type: Preferred Total Miles: 12,058
Non-Equity Miles: 967
Equity Miles:
Miles Available for Award Redemption: 11,025

| Activity Date | Type | Origin | Destination | Class | Flight No. | Description | Miles |
|---|---|---|---|---|---|---|---|
| 06-06-1999 | Other Activity | | | | | Hotel | 700 |
| 05-31-1999 | Other Activity | | | | | Credit | 2,725 |
| 05-21-1999 | Other Activity | | | | | Phone | 252 |
| 05-19-1999 | Statement Issued | | | | | STMT BAL | 7,348 |
| 05-18-1999 | Flight | LAX | LGA | Y | 701 | | 2300 |
| 05-16-1999 | Flight | LGA | LAX | Y | 801 | | 2300 |
| 05-16-1999 | Other Activity | | | | | Car Rental | 420 |
| 05-03-1999 | Other Activity | | | | | Hotel | 700 |
| 04-30-1999 | Other Activity | | | | | Credit | 2,908 |
| 04-21-1999 | Other Activity | | | | | Phone | 385 |
| 03-31-1999 | Other Activity | | | | | Credit | 1,870 |
| 02-28-1999 | Flight | LAX | LGA | Y | 701 | | 2300 |
| 02-21-1999 | Flight | LGA | LAX | Y | 801 | | 2300 |

FIG.3   PRIOR ART

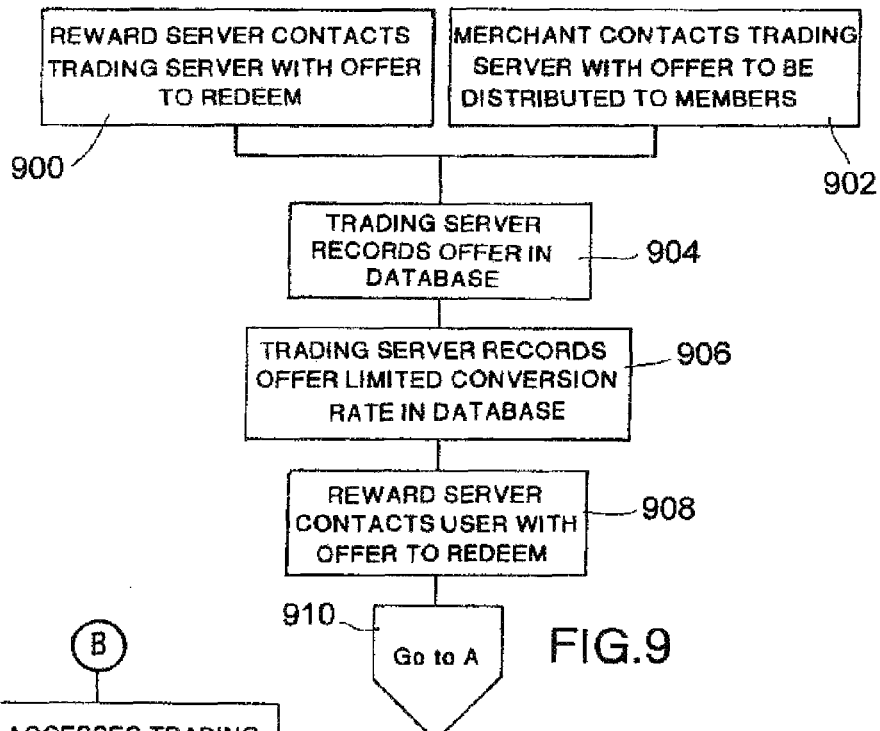
FIG.9
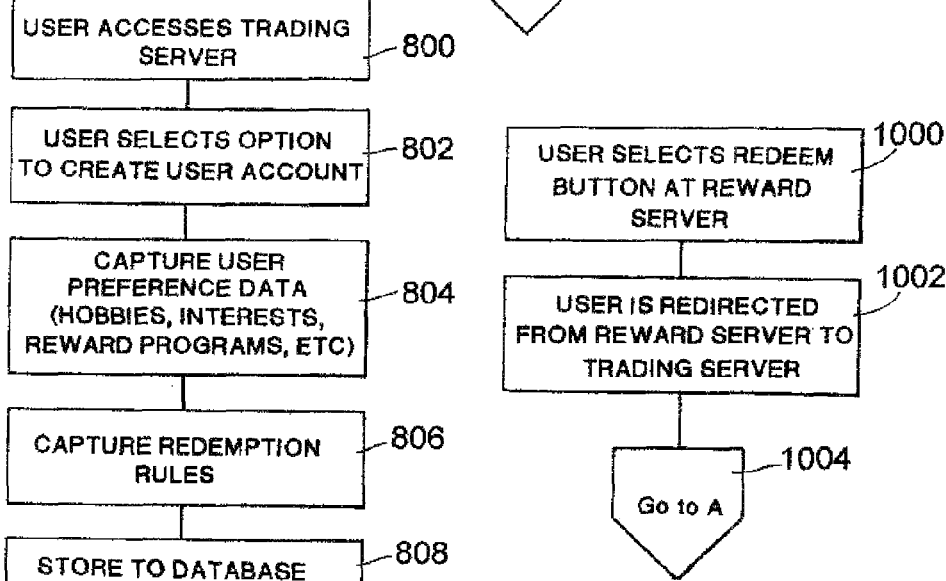
FIG.8
FIG.10

METHOD AND SYSTEM FOR USING MULTI-FUNCTION CARDS FOR STORING, MANAGING AND AGGREGATING REWARD POINTS

CROSS-REFERENCE TO OTHER APPLICATIONS

This application is a continuation application of prior application Ser. No. 10/835,547, filed Apr. 28, 2004 (now U.S. Pat. No. 7,716,080, issued on May 11, 2010), which is a continuation-in-part application of prior application Ser. No. 10/608,736, filed on Jun. 27, 2003 (now U.S. Pat. No. 6,820,061, issued Nov. 16, 2004), which is a continuation application of prior application Ser. No. 09/602,222 filed on Jun. 23, 2000 (now U.S. Pat. No. 6,594,640, issued on Jul. 15, 2003), which claims the benefit of U.S. provisional patent application Ser. No. 60/140,603, filed on Jun. 23, 1999.

BACKGROUND OF THE INVENTION

The present invention relates to a multi-function card such as a smart card, usable by a consumer for one or more functions such as a debit card, credit card, medical card, insurance card, club card, check card, or a loyalty card for use in a customer loyalty programs, and in particular to such programs that allow users to earn, barter, trade, manage and/or redeem reward points and other types of value (such as reward points obtained from bank-issued credit card programs such as CITIBANK or airline frequent flyer programs such as DELTA) into a number of individual reward or access accounts and a reward exchange account stored on the multi-function card, for obtaining products and services in exchange for those points or other value. This would allow users to use their accumulated values such as frequent flyer reward points, which are stored on the multi-function card, for products or services. In particular, this invention provides a real-time interactive and portable platform for managing the user's individual and aggregated reward accounts on a portable multi-function card such as a smart card, and for storing and/or modifying user profile information on the smart card by an authorized merchant, system operator, or other entity.

Consumers in today's world typically carry many cards on their person, such as credit cards, debit cards, frequent shopper or loyalty cards, smart cards, access cards, identification cards, medical benefit cards, etc. Each of these cards allows the user to execute a commercial transaction as well known in the art. Carrying such a multitude of cards around is cumbersome, and many times the consumer does not have the card he may need for a specific purpose. In addition, having a multitude of cards leads to a fragmented system of commerce. That is, there is no easy way to tie together programs from various cards such that an activity executed with one card (such as a credit card purchase) provides a desired result with another disparate card (such as increasing loyalty points in a general account).

Loyalty programs implemented with a consumer card, such as frequent flyer programs, frequent shopper programs, and the like, award loyalty points to its users based on purchases of goods or services made under the program. A typical example is an airline frequent flyer program that awards one point for each mile traveled on the airline. In this case, a round trip ticket from New York to California would result in the customer getting approximately 6,000 points in his airline account. A purchase made at a drugstore might be discounted if a consumer produces his frequent shopper card for that store. Similarly, credit card issuers such as CITIBANK award points for each dollar spent using their card.

The prior art does not provide for a consumer to utilize relatively small amounts of reward points or other types of merchant-provided value. In addition, even if a consumer does have a large number of reward points in a given reward account, he or she often can only redeem those points in a manner related to the issuing entity (e.g. airline-issued reward points may only be used for a free ticket or upgrade from coach to first class). This prior art does not recognize the need for a consumer to exchange reward points for non-travel related goods, and in particular renders relatively small numbers of points useless. For example, a consumer that does not travel often may have 500 points in UNITED AIRLINES, 700 points in USAIR, and 1000 points in DELTA, each of which is relatively useless in the prior art.

What is desired therefore, is a system where users may pool or aggregate the various earned rewards or other types of value into an exchange account, where the resulting value of the combined reward points or other value may be used to acquire items otherwise unobtainable with the individual reward accounts.

U.S. Pat. No. 6,594,640, ("the '640 patent") invented by the same inventor of the present application (and which is incorporated by reference herein), describes such a centralized reward points exchange system wherein a trading server computer executes trades of reward points from various reward points server computers into a reward point exchange account so that the aggregated reward points may be advantageously used for obtaining goods and services otherwise unobtainable. In addition to implementing a central server for storing reward point exchange accounts into which reward points are aggregated from various independent reward accounts as in the '640 patent, it is also desired to be able to track reward point accounts, both individual as well as aggregated reward points and other types of merchant-provided value, in a portable mechanism that may be carried by a user without reliance on a central server system, such as by using a self-contained storage device such as a multi-function smart card or a peripheral device. Smart cards implement processing circuitry, memory storage, input/output means, and user control means, in order to provide a user with a portable, hand-held solution as described herein.

It is therefore an object of the present invention to provide a multi-function card that allows a user to use one or more of many available applications (such as credit card applications, debit card applications, check card applications, etc.) that are encoded or otherwise programmed on the card at any given time.

It is a further object of the present invention to provide a loyalty program implemented on the multi-function card that tracks reward points and other types of values earned by the consumer in various reward accounts stored on the card and associated with the various applications executed by the card.

It is a further object of the present invention to provide a reward exchange account on the multi-function card that allows the user to aggregate reward points or values into the exchange account from one or more of the individual reward accounts, thus allowing for increased purchasing power due to the aggregated reward points, on a portable mechanism that can be utilized without reliance on a central server system as in the '640 patent.

SUMMARY OF THE INVENTION

The present invention is a multi-function card (e.g. consumer card, government card, corporate business card, etc.)

such as a smart card that integrates several types of functions, such as a credit card, debit card, loyalty card, and an identification card. The user may select the desired application for a given transaction, such as by selecting a credit card function for the purchase of an item from a merchant. The multi-function card also has memory for storing various accounts that track items of value such as rebates, coupons, reward points, etc. issued by various entities. A frequent flyer reward points program is typical of the programs to be implemented by this invention. These items of value may be utilized by the user during a purchase transaction, such as a coupon for 10% off of the purchase price of a certain item. In addition, a log may be kept of card activity, which may be downloaded off of the card at a later time for evaluation, such as for marketing purposes.

This invention also allows a user to aggregate reward points from various individual reward accounts on the multi-function card into a reward exchange account on the card in order to purchase goods or services using the aggregated reward points. The exchange account is transportable on the multi-function card, as are the individual reward accounts, thus decreasing (if not eliminating) reliance on a central server system.

In another aspect, the method and system of the invention provides a loyalty program that awards points for purchases made under the program (with or without use of another one of the card programs in the multi-function card) and automatically generates sweepstakes entry coupons based on the loyalty points accumulated in the program. These sweepstakes entries may be electronically stored on the card, or they may be printed out at a terminal such as a POS terminal, when the card is utilized there. The sweepstakes entry may be compared at the terminal to a database of previous winners to determine if that entry is a winner.

In a further aspect of the invention, data is collected and stored on the card regarding the shopping habits of the consumer. For example, a log may be kept that indicates the various stores where the consumer has made purchases in a given time period, as well as the items purchased (e.g. by storing UPC codes or the like). Consumer profile information may also be stored locally (on the card) or remotely (on a remote server), in which case the profile is linked to the card by its unique identification number. In any event, the shopping history, with or without various components of the consumer profile, may be archived and examined for marketing purposes.

In a further aspect of the invention, an RFID chip is embedded on the multi-function card to enable a tracking system to determine the whereabouts of the card (and its user) in a location such as a retail store. By keeping track of the user's location throughout the store, useful information may be obtained and analyzed for use in marketing activities and the like, as described further herein.

BRIEF DESCRIPTION OF THE DRAWING

FIG. 3 is a sample of the prior art reward summary from an airline frequent flyer system;

FIG. 8 is a data flow diagram of the user account creation process on the trading server;

FIG. 9 is a data flow diagram of the offer process by a reward program or by a merchant;

FIG. 10 is a data flow diagram of the process where a user may be redirected from a reward program to the trading server of the present invention.

DETAILED DESCRIPTION OF THE PREFERRED EMBODIMENT

The present invention is based on the use of a multi-function card, such as a smart card, which may be utilized by a user for any of various applications programmed therein, such as a credit card, debit card, check card, loyalty card, insurance card, medical card, etc. The smart card also allows for reward points and/or other types of values to be accumulated and stored on the user's card every time the card is used for associated application. For example, if a user uses his smart card to pay for a hotel that normally gives reward points, those reward points may be stored on the smart card in an account associated with that hotel. Likewise, when the card is used for the purchase of an airline ticket, the reward points awarded by that airline would be added to the smart card in a reward account associated with the airline. The user may then redeem the accumulated reward points by inserting the card into a smart card reading device or terminal associated with a computer connected to the Internet or other authorized communication system (e.g. an ATM or other reader). Information provided to the user regarding the user's reward points is updated after every transaction.

Multi-Function Card Layout

Figure 11:
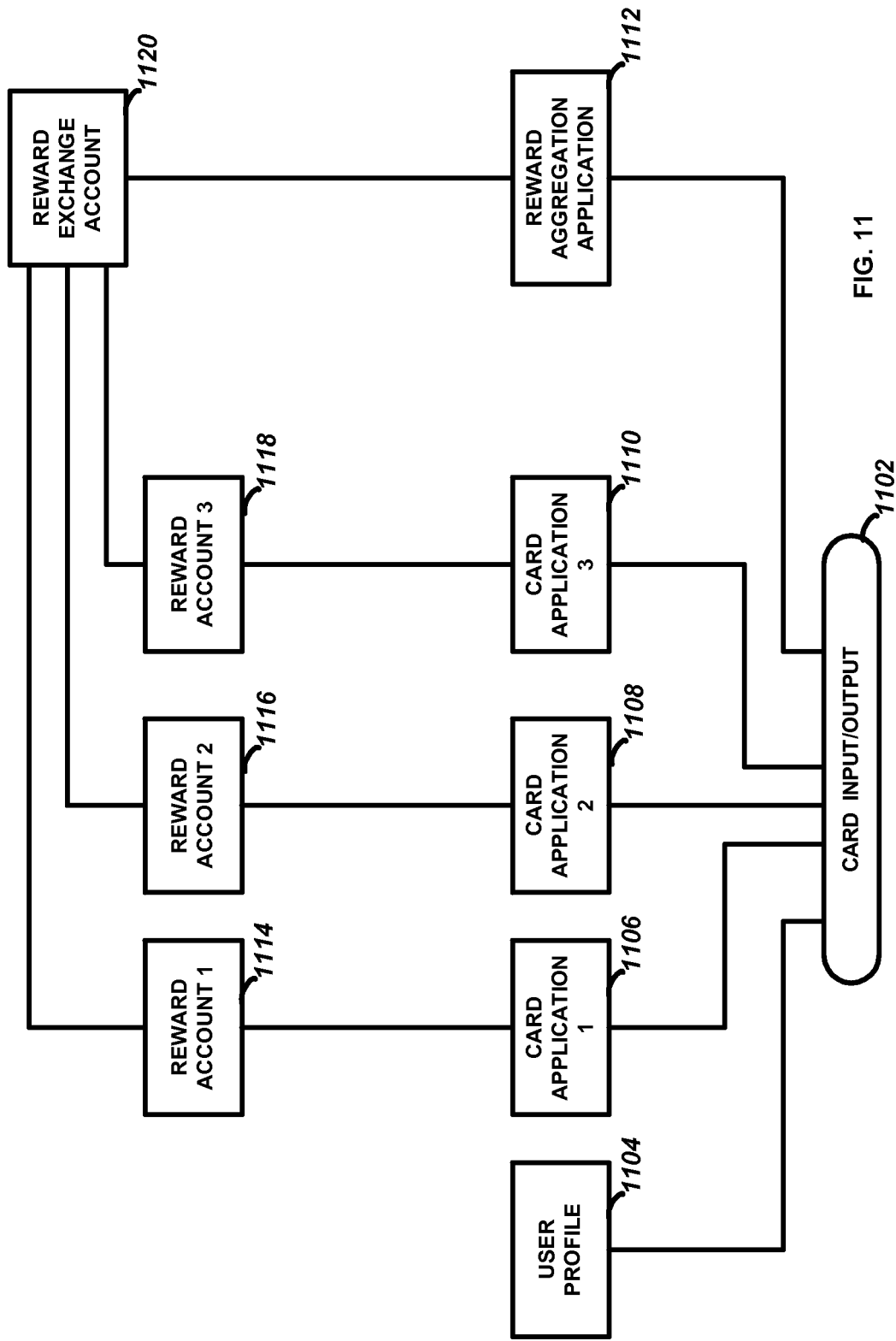
FIG. 11 is an illustration of the use of a smart card with the present invention.

FIG. 11 illustrates a functional block diagram of a multi-function card under this invention. The card has processing circuitry such as a microprocessor or microcomputer, program storage, data memory, and input output functions adapted to perform the functions as described herein. This example illustrates three applications—card application 1 1106, card application 2 1108, and card application 3 1110—although many more applications may be implemented as desired. Typical examples of card applications are a credit card application, debit card application, check card application, medical card application, insurance card application, and the like. For example, this card may have a CITIBANK VISA application, an AMERICAN EXPRESS application, and a WALGREENS DRUGSTORE application stored thereon.

FIG. 11 also illustrates three reward accounts, each associated with each of the card applications. Thus, reward account 1 1114 would be a CITIBANK VISA reward account, reward account 2 1116 would be an AMERICAN EXPRESS reward account, and reward account 3 1118 would be a WALGREENS reward account. These reward accounts are adapted to store reward points that are issued by the respective entities based on purchases made from that entity (in the case of WALGREENS) or purchases made using the credit card application of that entity (in the case of the CITIBANK VISA or AMERICAN EXPRESS applications). Thus, if a user purchases $50 worth of goods from WALGREENS using the multi-function card, then he would receive 50 reward points from WALGREENS that are stored in the WALGREENS reward account 1118 on the multi-function card. Note that if the user uses his CITIBANK VISA application to pay for the goods, then he may also receive 50 reward points from CITIBANK VISA that are stored in the CITIBANK VISA reward account 1114.

The smart card may also store in memory a user profile 1104, which performs several functions to be described further herein. The user will be provided with the ability to select the desired card application 1106, 1108, 1110 at any time. For example, a user may want to make a purchase at a merchant using the CITIBANK VISA credit card application 1106 on the smart card. He can select the CITIBANK VISA application at the point of sale by various means as known in the art, such as by buttons or other input mechanisms on the smart card, or by selecting an application from a display screen after the card is read by an appropriate smart card terminal. The terminal is interconnected to an appropriate network as known in the art (such as the CHASE network). Once the CITIBANK VISA application is selected, he may be given a choice of making payment for the item with (1) credit from the CITIBANK VISA account, (2) reward points or other values from his CITIBANK VISA reward account 1114 on the smart card, (3) aggregated reward points from his exchange account 1120 on the smart card (to be described later), or (4) any combination of the above. If he chooses (1), then he may be awarded CITIBANK VISA reward points which would be logged in his CITIBANK VISA reward point account 1114 on the smart card. If he chooses (2), (3) or (4), then the appropriate number of reward points would be deducted from the reward points account 1114 and/or reward exchange account 1120 (to be described later) and applied towards the purchase of the item.

A default account may be assigned so that when a user presents the smart card to a POS terminal, that default account is used unless another is specified. The default account to be used (e.g. CITIBANK VISA) may depend on the purchase involved, or upon the merchant with which the card is being used. For example, the card may be programmed to use the CITIBANK VISA application 1106 whenever the user presents the card at a supermarket, but the card may be programmed to switch to the AMERICAN EXPRESS application 1108 when the card is presented at a gas station. These default scenarios may be stored on the card in the user profile 1104, which may be changed by a user as described further herein. Of course, these defaults may be overridden by the user if so desired at the point of sale.

As previously mentioned, the integration of the credit card and loyalty card functionality allows reward points to be granted to the user based on the credit card transaction, and then directly deposited into the smart card's local memory. Likewise, the user may opt to use points from his local (or remote) rewards account in order to pay for the purchase (in whole or in part). Thus, a user may use the multi-function card of the present invention to pay for an item, and then be given the following options at the POS:

POINT TOTAL ACCRUED: _____
POINTS TO BE AWARDED FOR CURRENT TRANSACTION: _____
POINTS USABLE FOR CURRENT TRANSACTION: _____
HOW MANY POINTS DO YOU WANT TO APPLY TO CURRENT TRANSACTION? _____
PRICE IF POINTS USED AS ENTERED ABOVE: _____
POINTS REMAINING IF POINTS USED AS ENTERED ABOVE: _____

The user may then make the desired selection and the transaction will proceed accordingly.

Reward Point Aggregation on the Multi-Function Card

A reward point aggregation exchange account 1120 may also be stored in memory on the smart card. Reward point aggregation is described in detail with respect to a central server system in the '640 patent, which is also described in further detail below. Basically, reward point aggregation allows a user to combine points from multiple disparate reward accounts into a single exchange account, and use the aggregated points for purchases of good and services. Thus, a user may choose to exchange 500 points from his WALGREENS reward account 1118 and 2,400 reward points from his AMERICAN EXPRESS reward account 1116 into his reward exchange account 1120. Assuming a one-to-one conversion ratio (which may be different according to the exchange arrangements made between the participating entities), then the user would have 2,900 aggregated reward exchange points in his exchange account 1120 as a result of the exchanges. These 2,900 points may then be used to make purchases from participating merchants. Consideration will be exchanged between all participating parties to account for the points exchanged, as described further below with respect to the central server system. For example, the "exchange entity" associated with the reward exchange account 1120 (which may be an independent third party, a party issuing the multi-function card, or one of the individual reward-issuing entities described above) will receive consideration from the entity that exchanges reward points into the exchange account. In a simple example, when the user exchanges 500 WALGREENS reward points from his WALGREENS account 1118 into the exchange account 1120, then WALGREENS will also convey consideration related to those 500 points (e.g. $5.00 if the points have a value of one penny per point) to the exchange entity in exchange for taking the WALGREENS points off of WALGREENS account. Since reward points issued by the issuing entity are a liability of the issuing entity, the issuing entity will pay the exchange entity for assuming that liability. As a result, although the exchange entity will now have a 500 point liability to the user after the exchange, it has also gained $5.00 to settle that liability when the user chooses to redeem his exchange points with a merchant.

Discounts may be taken by any party in the transaction to account for the costs of implementing the program. Thus, the exchange entity may only credit the user with 450 points after the exchange transaction, such that it has only a $4.50 liability to the user on redemption of the exchanged points, resulting in a 50 cent (10%) fee on the exchange. Alternatively, the exchange entity may give full 500 points credit to the user but charge him a transaction fee on the exchange and/or the redemption transaction.

A user may be given access to the individual and exchange reward accounts, for example after insertion into a smart card reader or terminal, so that he may control (using reward aggregation application 1112) reward point exchanges between the individual reward point accounts 1114, 1116, 1118 and the reward point exchange account 1120 as described above. The user can then use the aggregated reward points from the exchange account 1120 on the smart card to make purchases at merchants that agree to accept the aggregated points.

Optionally, the smart card reward point account totals may, if desired, be reconciled at some point with the entities that are associated with the respective reward accounts. For example, if a user has a CITIBANK VISA reward points account 1114 on his smart card, then he may enter the card into a smart card reader or terminal, and the terminal may communicate with the appropriate CITIBANK VISA server computer over a network to reconcile his account with the server. If communications with the appropriate server is not available during a transaction, then a flag will be set in the smart card memory to indicate that a reconciliation must be done at the next available time (i.e. the next time communications is established with the server). This will enable CITIBANK VISA as the issuing entity to determine how many reward points may be outstanding (i.e. its liability in reward points). In addition, reward points that have been aggregated into the exchange account 1120 may also be reconciled with the exchange entity (the entity that operates the points trading system).

The multi-function card may store multiple reward accounts issued by a single entity, wherein each account is individually tracked and utilized by the user but wherein the accounts may be aggregated into an exchange account as previously described. For example, a user may hold several VISA accounts issued by one or more issuing banks (such as a VISA RED account, a VISA BLUE account, and a VISA WHITE account), and the user will use whichever VISA account desired for a given transaction or application. Each account is separately tracked, funded, and reconciled, and the reward points may be aggregated into the exchange account 1120 on the smart card if desired. In another example, a user may hold various CITIBANK accounts on his smart card, such as a CITIBANK VISA and/or MASTERCARD, a CITIBANK investment account, a CITIBANK mortgage account, etc. and selectively redeem and/or aggregate reward points as previously described.

In one embodiment, accounts associated with various loyalty programs may be stored on a smart card, wherein the various loyalty programs are configured with points that are either partially funded or fully funded. A fully funded reward program provides reward points to users for purchasing products, for using their services, etc., wherein the reward points are fully accounted for on the accounting books of the entity. In a partially funded program, only a portion of the reward points may be accounted for on the books of the rewarding entity, or all of the points may be accounted for but at a discounted (partial) value. By storing the various programs on a single smart card, the user may be able to easily aggregate points from all of the programs into the exchange account as described herein.

As previously mentioned, the present invention allows various types of values (such as reward points, coupons, rebates, etc.) to be stored from different entities. In an alternative embodiment, certain combinations of values may provide a greater value as a result of aggregation. For example, a pizza restaurant may provide points towards free pizzas, which would be stored on a Pizza account on the smart card. Similarly, a supermarket may provide points for purchasing soda, which would be stored on a Soda account on the smart card. In addition to (or in the alternative to) trading in points for pizza and/or sodas directly, the user may aggregate the values provided by each of the entities to obtain a sweepstakes entry sponsored by both entities. That is, by aggregating the values provided by both reward issuing entities, the user may be able to obtain the individual rewards as well as a reward obtainable only by aggregating the values together (the sweepstakes entry).

In another embodiment of the present invention, a consumer is provided with a multi-function card that is sponsored by a retail store or chain of stores such as a drugstore such as WALGREENS. In order to obtain the card, the consumer must go through a registration process, where he or she provides personal data such as name, address, telephone number, email address, etc., as well as demographic data such as age and gender. This profile data may be compiled (and optionally stored in the user profile 1104 on the card) and used for marketing purposes, alone or in conjunction with shopping pattern data collected and stored on the card during its use.

After completing the registration process, the consumer is provided with the multi-function card that has a unique account number printed thereon (as well as encoded in a bar code and/or magnetic stripe). The initial function of the multi-function smart card is a loyalty card for frequent shoppers. When the consumer makes a subsequent purchase at the drugstore, then he gives the cashier his loyalty card and the card is swiped, dipped, or otherwise entered into the POS terminal. Data is captured regarding the products purchased by the consumer, the consumer's account number, the prices paid, etc. In addition, points will be credited to the consumer's account, typically in the amount of one point per dollar spent. Thus, a purchase totaling $54.00 will net the consumer 54 points. In the alternative, the points may be credited as a function of the amount spent (e.g. purchases over $100 yield a 1.5 point per dollar ratio), or as a function of purchasing certain classes products (e.g. vitamins yield a 1.25 point per dollar ratio) or as a function of purchasing certain brands of products (e.g. all COKE products provide a 2 point per dollar ratio), etc. The points are then stored in the associated reward account on the multi-function card.

Thus, the consumer will accumulate reward points over time based on his or her purchase at the merchant. Since the reward points are stored locally on the smart card, the consumer will be able to dip the smart card into a smart card reader terminal (such as a kiosk in a public area or a terminal connected to a personal computer) and access the data stored thereon.

In addition to reward points, other rewards in the present invention may be in the form of coupons, rebates, and/or a sweepstakes entry for the consumer. For example, at certain intervals of points accumulation (e.g. for every 500 points), the consumer may be provided with a sweepstakes entry (and the points account may optionally be reduced accordingly). The sweepstakes entry may be in the form of a paperless entry (electronic only), wherein the clerk at the cash register will be provided with a message that the consumer has reached an award level and is being awarded a sweepstakes entry. The trigger that indicates that a sweepstakes reward has been provided may come from an external server or from the multi-function loyalty card itself. The cashier might then say "Congratulations Mr. Smith, you have just been awarded an entry into our monthly sweepstakes, in which you may win $5,000". In addition, the POS terminal may be adapted to print out a coupon that evidences the sweepstakes entry, and the cashier would then give the coupon to the consumer accordingly. In addition, the consumer may be notified by email, regular mail, telephone, etc. Once the sweepstakes is held, the winner(s) may be notified by using the information provided at registration.

RFID Based Card Tracking

In another embodiment, the multi-function card has an RFID transponder chip embedded or otherwise attached to it. RFID technology is known in the art and enables a mating transponder to determine if the RFID chip is within its proximity, and it can read a unique identifier associated with the RFID chip to ascertain which particular card (and which consumer associated with that card) is within its proximity at any given time. The retail establishment will have a number of mating fixed-location transponders located strategically throughout the store, such as one or more at every aisle, one at the entry point, one at each POS terminal, etc. The fixed-location transponders are also interconnected to a network in the store, which also has a tracking server computer. By communicating with each of the fixed-location transponders, the tracking server will be able to determine if an RFID-enabled card is within proximity to any one or more of the fixed-location transponders at a given time. This tracking information may be compiled by the tracking server computer and analyzed in real time or offline to track the path of the card around the store as the consumer shops in the store.

For example, the tracking server will be able to determine when a certain customer has entered the store, which aisles he visits and for how long, and when the customer goes to the POS checkout terminal. By utilizing enough fixed-location transponders, the tracking server computer may benefit from enough granularity to ascertain if a certain customer stops at a certain location in an aisle and how long he may dwell there.

This information is useful when used in conjunction with data obtained from an actual sale to that consumer. For example, the tracking server may determine that John Smith entered the store at 3:05 PM, and proceeded to the magazine aisle, where he lingered for 15 minutes before moving on to another aisle. The system will see that he did not purchase any magazines (only vitamins) notwithstanding his long stay in the magazine aisle. This event-based geocentric information may be utilized by the system in various ways. For example, Mr. Smith may be given a coupon at checkout for a discount on a magazine, since he showed an interest in a magazine but did not purchase one. Or, he may be told by the cashier that he will get increased reward points in his reward account if he purchases a magazine now or at a later date (e.g. "Mr. Smith, you will get double reward points if you purchase a magazine today or the next time you come in"). In addition, the system may use the customer location tracking information to award points and/or coupons for products sold in an area of the store that was not visited by the consumer (e.g. "Mr. Smith, we see that you have not visited our gift card aisle—we would like to give you a $1 coupon (or double reward points) for you to make a purchase of an item from that aisle.") This incentive will help drive shoppers to parts of a store that may otherwise suffer from low amounts of traffic.

Reward points may also be awarded based on the user simply visiting certain locations of the store (or perhaps by staying near a location for a certain time period), since the RFID chip will enable the store's tracking system to determine the location of the user at any time. After the user executes a transaction with the store's system, the earned reward points may be added to the user's reward account on the smart card accordingly. For example a user may earn 50 points for browsing near the soda aisle, or 100 points for staying near the vitamins aisle. These points would be held temporarily by the store's system until the user checks out and swipes his smart card, thus enabling the 150 points to be added to the user's smart card. The location tracking may be combined with the actual purchases made by the user, such that browsing in a certain aisle, accompanied by the purchase of a certain product, would yield a certain number of points.

When a user who is carrying a smart card enters a store with appropriate RFID tracking devices, the tracking device will be able to determine the identity of the user via information exchanged between the smart card and the tracking device (e.g. a user identification number). The system will be able to generate personalized offers based on prior shopping history as well as a user profile that may be stored in the system's server. For example, when a user enters a store with the RFID technology enabled, the system may determine that he usually purchases soda and snacks, and then the system can generate offers, coupons, or other incentives related to these products and present them to the user as soon as he enters the store via a kiosk or the like. The offers may be printed out, or they may be electronically displayed. In the alternative, the user may be requested to insert his smart card into a reader terminal, after which the system will be able to generate the offers and either load them into the smart card memory and/or display them to the user to aid in his shopping. In the event that the user inserts his card into a reader terminal, then the system can use the profile information directly from the smart card and need not refer to a central server for this purpose.

A user would be able to access the data stored in his smart card (i.e. his account totals) by inserting the card into a reader associated with a computer such as a personal computer at home. The user would then be able to see the totals of each of his reward accounts, his exchange account, etc., and also be provided with the ability to control exchanges between accounts. For example the user could insert his smart card into a terminal, and a window would automatically pop up on his screen showing the various account totals, etc. By using his mouse or keyboard, he could make the desired exchanges. Any reconciliation that must be made with the reward issuing entities may be done at the same time over a networked connection such as the Internet.

In addition, the card may be configured to store rebates and coupons. For example, the card may be programmed with one or more purchase coupons that may be used at the point of sale by the consumer. The consumer would use the multi-function card when making the purchase, and the UPC or other product identifier would be scanned at the POS terminal and then compare to any coupon files stored on the card. If there is a match for that UPC, then the coupon discount would be applied, and the coupon may be optionally deleted from the card (if it is a one-time use coupon).

Similarly, rebates may be stored on the card. In one example, a rebate for $3.00 for the purchase of a certain DVD is stored on the card. When the consumer buys the DVD with the card, the rebate data appears at the POS terminal and the consumer is given a form to send in to get the rebate. The rebate may arrive as a check in the mail, or it may be posted to the account in the card immediately. Rebates may be added to the card at a POS transaction as well, such as when the POS terminal adds a rebate to the card memory after purchase of a certain item.

Rebates and coupons may be added at the POS terminal, or they may be added at any smart card kiosk that can interoperate with the card. For example, the consumer may have a smart card reader connected to a home computer. The consumer may dip the smart card into the reader, log onto a server over the Internet, and exchange coupon and rebate data accordingly. Rebates may be added to the smart card memory, or the rebate may be executed for a prior purchase wherein the purchase record is read by the server and the rebate amount is credited to the consumer's account.

User Profiles

A user profile may be stored in the smart card. The user profile would contain various information regarding the user, including but not limited to any or all of the following types of information: name, address, social security number, age, gender, income, demographics, psychographics, biometrics, names of various rewards accounts, passwords, prior purchase history including details of transactions executed, and preferences. Preferences may indicate which accounts on the smart card that the user would prefer to utilize in certain situations as mentioned above; e.g. use the VISA application at supermarkets but use the AMERICAN EXPRESS application at gasoline stations. Preferences may also indicate how the user would like to utilize reward accounts; e.g. he would prefer to pay for an item with 50% points and 50% credit, or he would prefer to pay for business expenses with credit only and personal expenses with points only, etc. These user preferences may be modified and accessed by the user when the smart card is inserted into an appropriate reader or terminal as known in the art. These user preferences may also be utilized by the various applications stored in and executed by the smart card as required. For example, when the user swipes the smart card to pay for gasoline, an the purchase application may check the user profile to determine (1) which account to use unless otherwise specified, (2) how to pay for the item, e.g. with points and/or credit, etc.

The smart card may be utilized in a real-time interactive transaction between a user and a merchant at the point of sale. When a user presents the smart card to the POS terminal at the merchant, the terminal accesses the memory and/or firmware of the smart card and can execute one or more of several types of real-time transactions. The POS terminal may upload into the smart card memory one or more special offers, coupons (and reward points) that are based on the current transaction. For example, if a user is purchasing dog food, the POS terminal may upload dog food coupons to the smart card. These coupons may be good for the next visit with the merchant, or they may optionally instantly redeemable if desired.

The merchant POS terminal may interact with the smart card (in particular with the user profile) by utilizing a scoring model to determine a user's relative worth to that merchant. That is, by analyzing profile data, including prior purchase transactions, as well as other user data, the POS terminal can assess a score to the user that will reflect the relative value of that user to the merchant. For example, if most of a user's purchases were of low margin items, then that user would have a lower score than a user that purchase more high margin items, since high margin sales are generally worth more to a merchant. That user may be provided with coupons, rebates, points, etc that are reflective of that user's relative value as indicated by the scoring model. This incentive system will interact in real time with the user to provide optimal benefits to both the ser as well as the merchant based on the parameters set forth in the scoring algorithm.

In another embodiment, users who provide relatively more data to their profile (and allow their profile data to be used by merchants) will be provided with relatively greater rewards by the participating merchants. For example, if a user is willing to share his income data with merchants, those merchants may reward him with more coupons, rebates, reward points, or other incentives, than a user that is unwilling to share his income data. Since a user's income data is valuable to a merchant he is willing to provide a greater incentive to those users that make it available in their profiles on the smart card.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card may be linked to the user's points account. In this manner, the user and merchant can use the points account to pay for purchases in a seamless manner whereby points are used for consideration rather than or as a supplement to cash and traditional credit.

Central Server Aggregation Model

Figure 4:
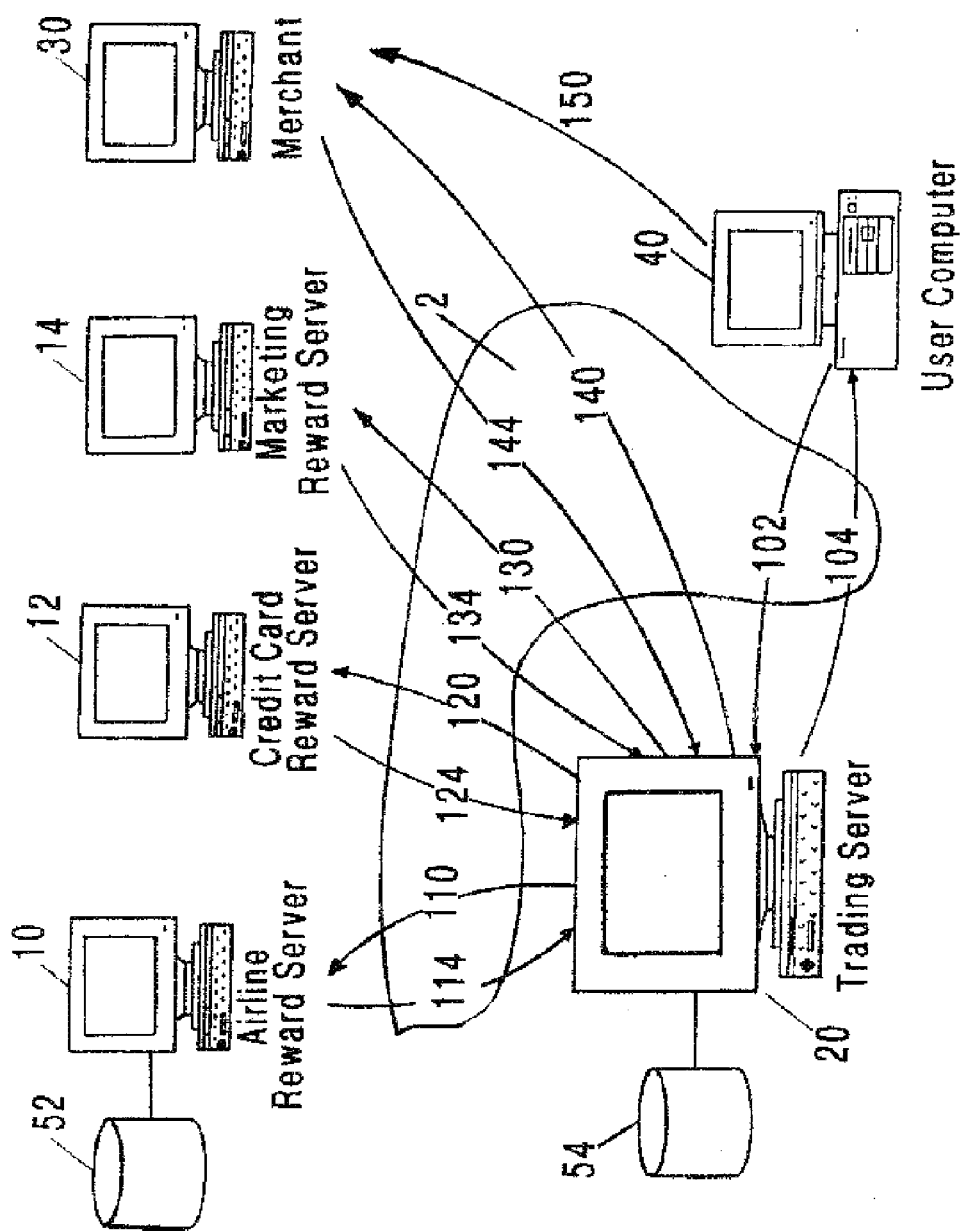
FIG. 4 is a block diagram of the components of the present invention.

The centralized exchange server system and method, as set forth in the '640 patent, will now be described in detail. With reference to FIG. 4, a plurality of reward server computers 10, 12, 14, a trading server 20, a merchant computer 30 and a user computer 40 are shown in communication with a network 2. The network may comprise any type of communication process where computers may contact each other. The present invention will be described with respect to an Internet-based network where the reward server computer 10 is associated with an airline frequent flyer program. Any type of reward server may also be used in this system. The reward server computer may be a credit card reward program such as that offered by American Express where the user earns rewards based on purchases, or an advertising based award program where the user earns rewards by selecting advertising content for viewing on the Internet.

Figure 1:
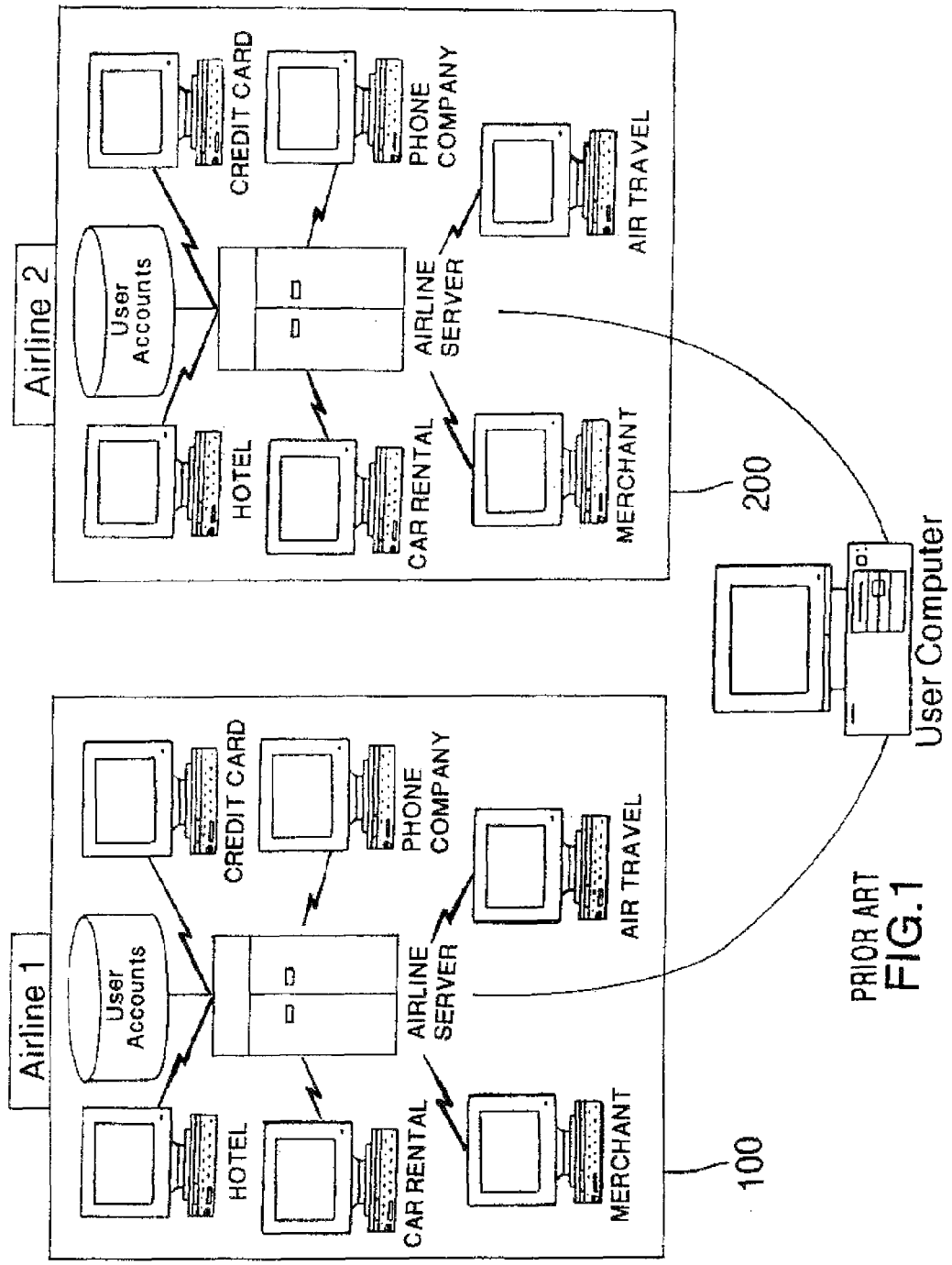
FIG. 1 is representative of the prior art marketing arrangements used in reward programs.
Figure 2:
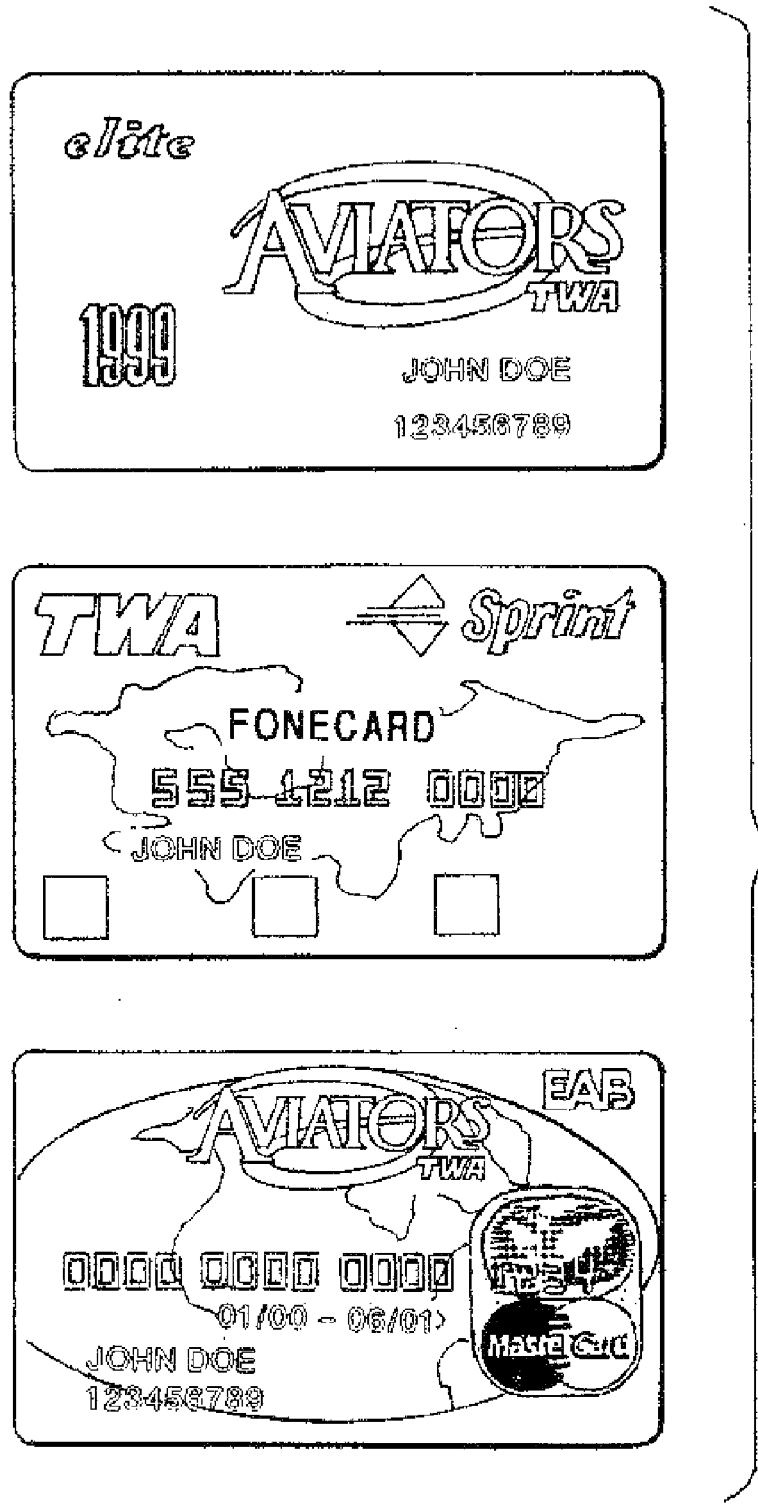
FIG. 2 is a representation of the co-branded partners in a prior art award program.

A user of this system may acquire and accumulate rewards or values through any prior art means such as shown on FIG. 1, which are then posted in a user's reward point account 52 that is accessible through the reward server computer 10. The trading server computer 20 is in communication through the network 2 with a user on a user computer 40 and is additionally able to connect to the reward server computers 10,12,14 through the network 2 in accordance with techniques well known in the art for Internet communications. Alternative electronic communications methodologies may be used, such as an ATM adapted to allow a user to access his accounts, or a smart card reader, etc. The merchant computer 30 is representative of any site that can communicate with the network that has goods or services for sale or trade. The merchant may have a direct relationship with the trading server where the direct relationship allows for a streamlined process for allowing a user to acquire products offered via the merchant computer. Alternatively, the merchant computer may be an independent merchant that does not currently have a profile defined in the trading server that will accept payment from another computer system in any one of well known e-commerce embodiments.

The rewarding entities may be any type of entity that has a service for allocating points or consideration for user actions or values for determining a user's relative value to the system. The reward server computers 10,12, 14 may be of any type of accessible server capable of holding data about a user along with a corresponding earned value that is negotiable for other goods, services, or points of another system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The trading server computer may be any type of computer system that allows users to access the system in order to perform the processes involved in this invention. In the preferred embodiment all of the systems described are accessible through the Internet and the user may automatically or freely navigate to any site by means well known in the art.

The present invention allows points issuers, who originally sold reward points in their program to third parties for use as an incentive by those third parties, to repurchase or trade points at a discount, thereby reducing their liability and allowing for a trading strategy that enables points to continually be sold and repurchased. This process may be executed under a separate accounting procedure than what is otherwise used for points that are granted directly from the issuer.

Figure 5:
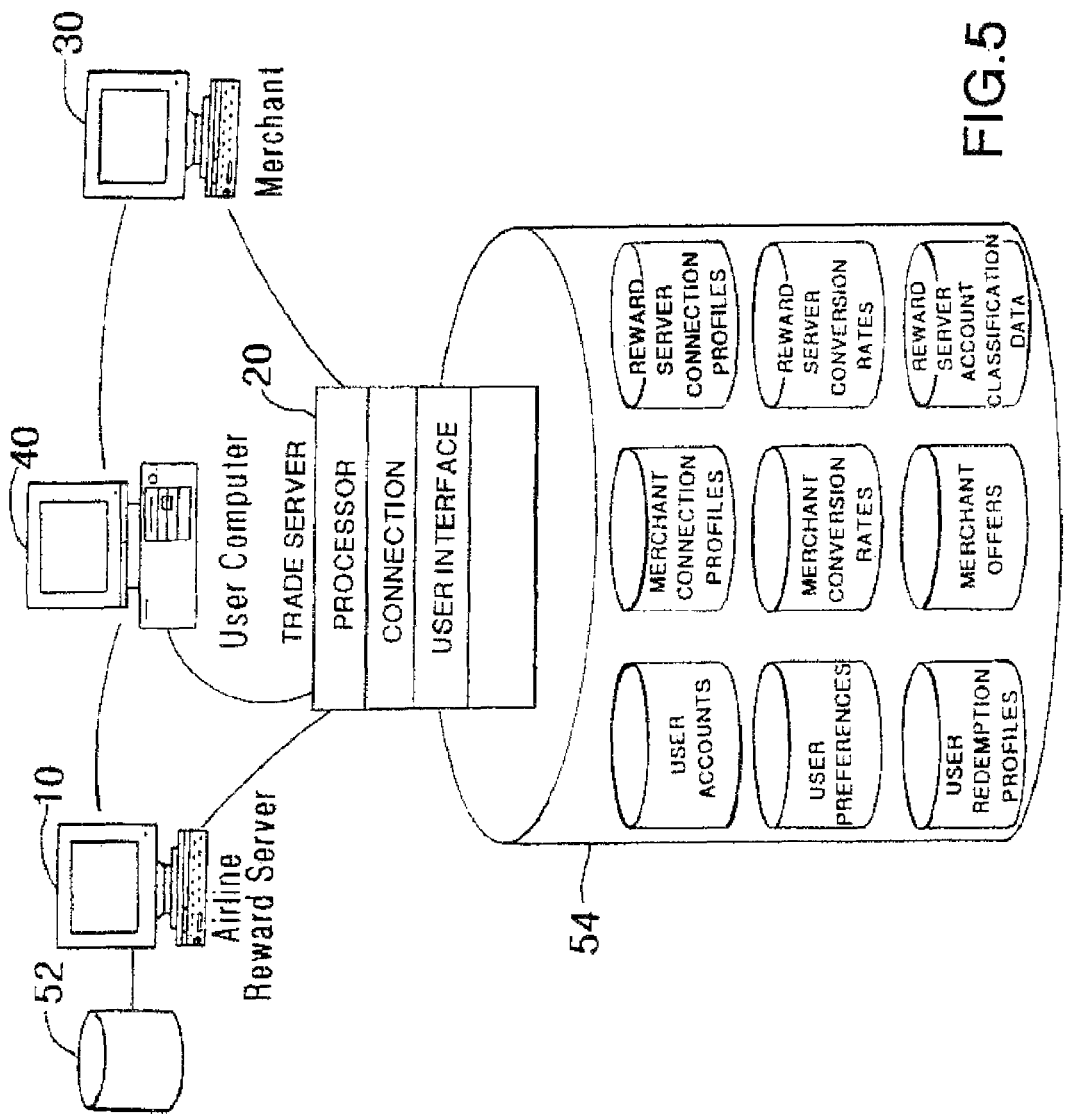
FIG. 5 is a block diagram of the system components of the present invention.
Figure 6:
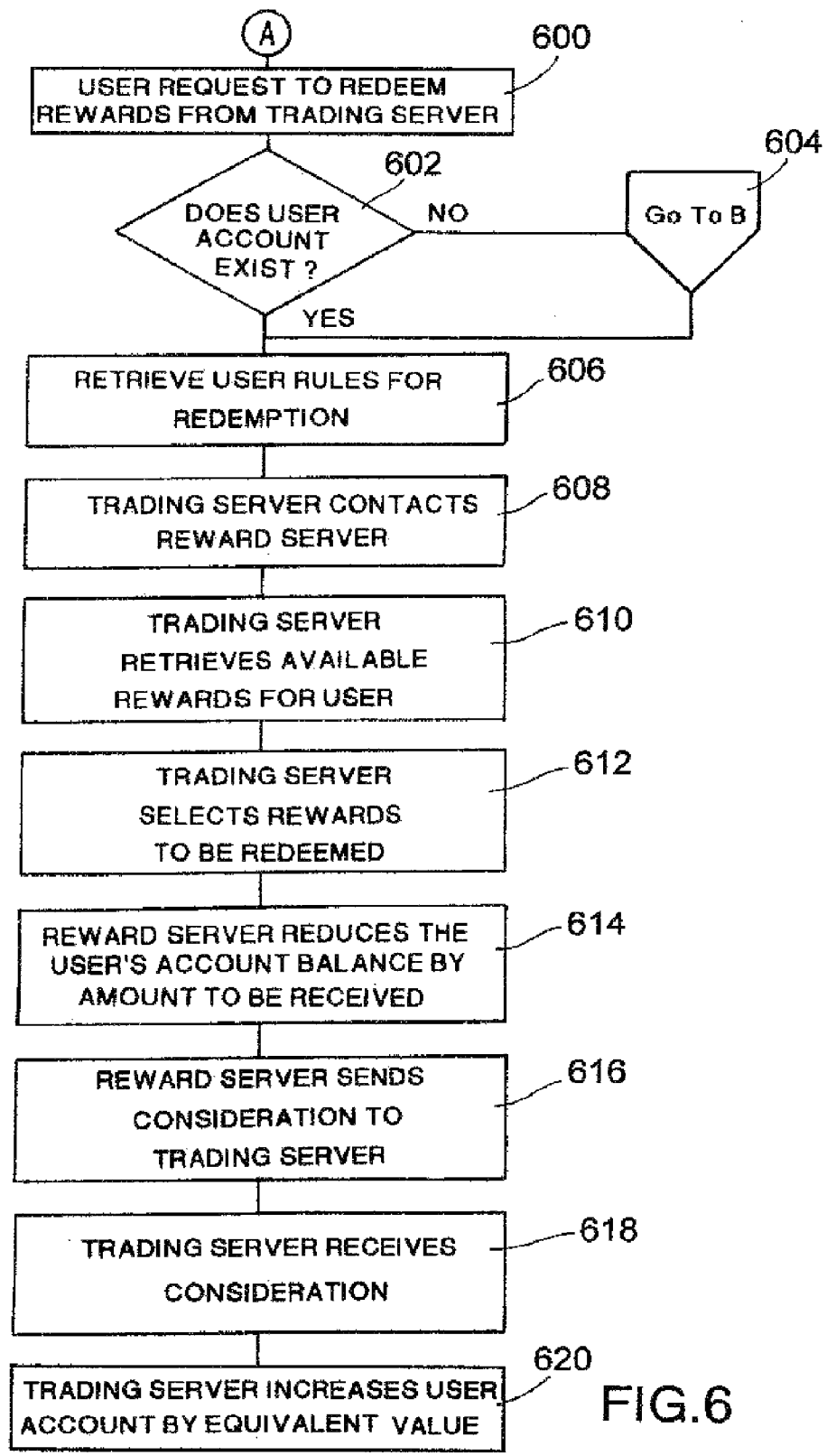
FIG. 6 is a data flow diagram of the process for a user to redeem rewards.

The method of allowing the user to redeem the accumulated reward points from one or more of a plurality of reward entities will now be described with respect to FIG. 4 and the data flow diagram of FIG. 6. The trading server system would allow users to "log in" to access the functionality provided where the user may interact with applications, forms or controls. For example, the user may view his account information by using a web browser which may automatically select or allow the user to enter the appropriate identification information and then select buttons, links or other selectable objects to navigate to the part of the system desired. In the alternative, navigation may be done automatically by the web site, and thus be transparent to the user (i.e. not directly controlled by the user). If the user does not yet have an account (step 602), then the user may be enrolled per the flow diagram of FIG. 8 (step 604) as discussed below. The user, from the user computer, makes a request to the trading server computer 20 via communications flow 102 (step 600), requesting redemption through the network 2 for either all or a portion of the pre-accumulated reward points stored for the user in one of the rewarding entities. A user's reward point account 52 is associated with each of the reward servers but is only shown in FIG. 4 connected to the airline server for sake of clarity. Communications are made by the trading server 20 to the user computer 40 via communications data flows 104. The user may interactively select rewards to be redeemed, or the system may determine which rewards are to be redeemed based on a previously defined user profile rule or other third party profile rule (such as an issuer) (step 606). The trading server computer 20 "obtains" the reward points balance information from a reward server 10, 12, 14 stored in the user's account 52 by contacting the appropriate reward server via communication flow 110 (step 608) according to the user's requirements, by using the connection parameters as defined in a database 54 on the trading server as shown in FIG. 5. In one embodiment, the trading server retrieves reward point account balance information via communications flow 114 (step 610) from the reward server for the user. In another embodiment, the trading server transfers as part of the communication 110, the requested reward points to be redeemed (step 612). The reward server computer 10 decreases the user's reward point account 52 by the requested number of reward points (step 614). The term point is used to reference any earned value that has a cash equivalent or negotiable worth as in "frequent flyer" point or mile. The reward server computer 10 conveys consideration to the trading server computer 20 where the consideration corresponds to the number of reward points decreased in the user's account 52 on the reward server 10 (step 616). For example, the consideration may be in the form of a monetary credit to an account that exists between the trading server and the reward server, that gets paid at the end of a predefined billing cycle (i.e. every month) or in real time or upon execution of a trade or redemption procedure. The trading server computer 20 increases the reward exchange account 54 associated with the user by the received number of points (step 620). The trading server computer 20 in turn, receives the consideration from the reward server computer 10 (step 618).

Similar communications are made between the trading server 20 and the credit card reward server 12, as indicated by the data communications 120 made by the trading server 20 to the credit card reward server 12 and the data communications 124 made by the credit card reward server 12 to the trading server 20. Likewise, communications are made between the trading server 20 and the marketing reward server 14, as indicated by the data communications 130 made by the trading server 20 to the marketing reward server 14 and the data communications 134 made by the marketing reward server 14 to the trading server 20. In each case, the trading server 20 increases the user's reward exchange account 54 by the received number of points from the credit card reward server 12 and the marketing reward server 14, respectively.

Figure 7:
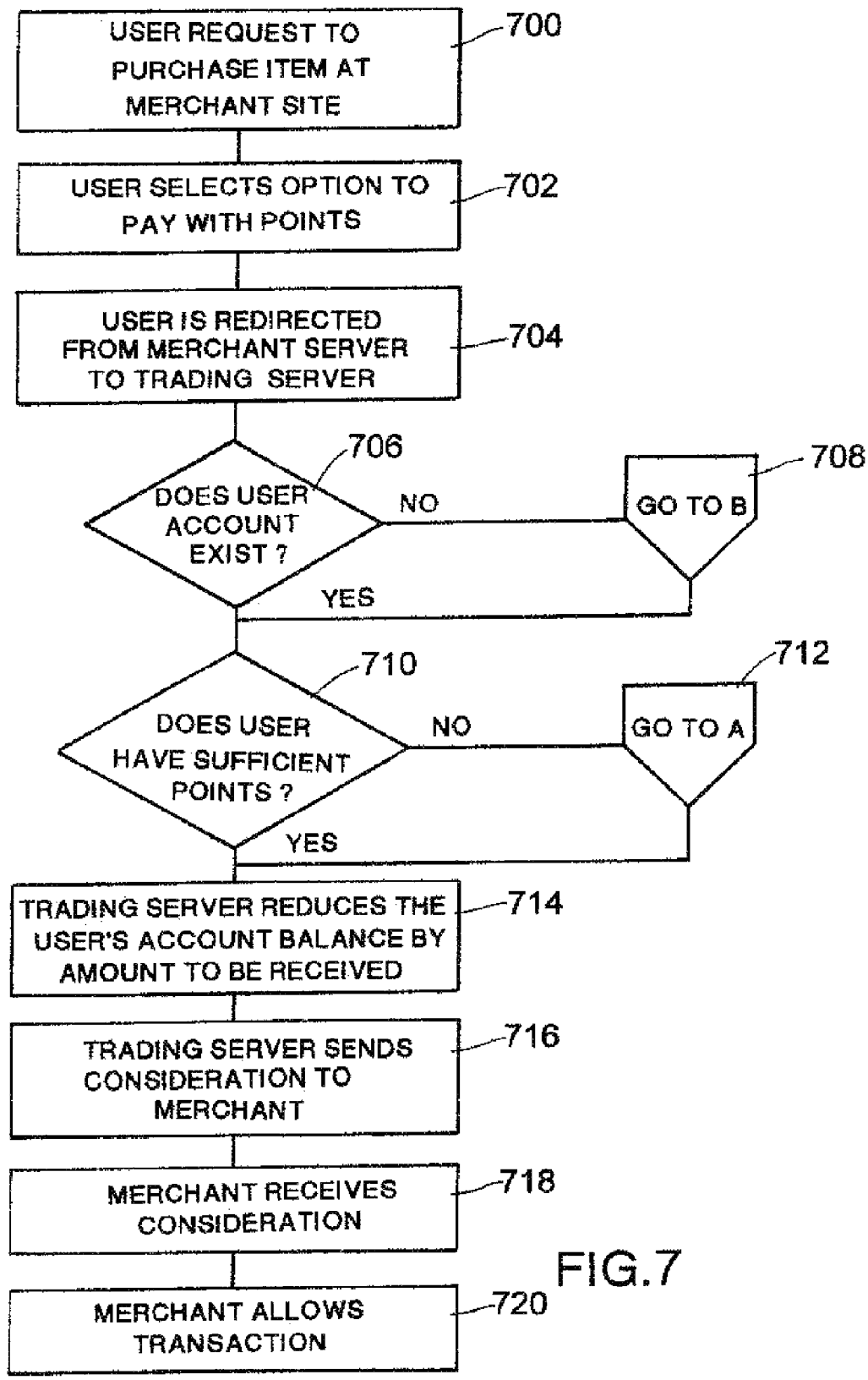
FIG. 7 is a data flow diagram of the user request for purchase of an item at a merchant site.

In the second part of the transaction (see FIG. 7), the user from a user computer 40 may make a request 150 to purchase an item from an associated merchant computer 30 (step 700) or from a catalog or network of offerings or special event offerings as a one-time or unique event. In the preferred embodiment, the merchant computer system will be a networked computer system accessible via the Internet. The user would visit the site by selecting on a link from the trading server's web site or by entering the name or address of the destination site or product brand or category desired. The web site may also be pushed to the user rather than pulled by the user as described above. The user may identify one or many items to be acquired from one or several merchants 30. The user elects to pay for the desired item with points (step 702), and the user is redirected from the merchant server to the trading server at step 704. If the user does not have an account (step 706) then the user is enrolled per the flow diagram of FIG. 8 (step 708). The merchant server computer 30 would confirm that the user has sufficient points or value to purchase the selected item by communicating with the trading server 20 via communication flows 140, 144 in order to check the user's reward exchange account 54 (step 710). If the user does not have enough points in his reward exchange account at the trading server 20, then the process of trading more points from the user's reward point account 52 into his reward exchange account 54 is executed by branching to the flow diagram at exit point A (step 712) which brings the process to the flow diagram in FIG. 6 discussed above. After enough points are traded, the user continues with the process from step 712 as shown in FIG. 7. The user may also borrow additional points to make purchases. The trading server computer 20 would request the merchant computer to deliver the item to the user. The user delivery information may be retrieved from the trading server computer 20 or may be supplied in some other manner. The trading server computer 20 would decrease the user exchange account 54 by the number of points or value corresponding to the purchased item (step 714). The trading server computer 20 conveys consideration to the merchant computer 30 equivalent to the cost of the item by means well known in the art of electronic commerce (e.g. by a preexisting account, credit card, etc.) (steps 716, 718). In the alternative, the consideration may be a direct transfer of points to an account associated with the merchant. The merchant then completes the transaction at step 720, for example by delivering the purchased item. A transaction fee may be charged by any of the parties in the form of points, cash or cash equivalent, etc. Also, a delivery fee may be charged for delivery of the product.

Policies and profiles may be established to automatically contact each of the reward servers according to a user profile, merchant profile, broker dealer profile, issuer profile, or product provider redemption profile (see FIG. 5) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process transparent to the user where the user may select how the transaction should proceed. If the user exhausts lower personal worth resources from the reward servers, the system may be required to contact the user before the transaction is allowed to proceed to redeem points. A classification system may also be used to indicate rewards of similar worth or category. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted or based upon a preferred hierarchy defined by the system or its members.

FIG. 8 describes the process steps involved in enrolling a user to utilize the trader server. The user accesses the trading server 20 at step 800 and selects an option to create a user account at step 802. The data entered by the user may be used in determining whether a user allows unsolicited offers to be presented from the trading server. In addition, offers may be provided in an automatic fashion without user interaction. The user's preferences for manufactured goods services, products, travel destinations, hobbies, interests or any other user entered criteria may be stored in the database for subsequent use by the system (steps 804 and 808). The trading server has the ability to receive offers from reward servers or merchants (steps 806 and 808) which may then be directed in real time to users based on the database profile information provided by the user or other third party (e.g an issuer, merchant, etc.) (see FIG. 9). At step 900, the reward server contacts the trading server with an offer to redeem points. Similarly, a merchant may contact the trading server with an offer to be distributed to members (step 902). The trading server records the offer in a database (step 906), and the trading server may record a limited conversion rate in its database (step 906). The reward server may then contact the user with an offer to redeem at step 908. Optionally, the process may branch to the flow diagram in FIG. 6 discussed above (step 910).

The trading server may also be contacted in response to a button or hyperlink located on a web page accessible by the user from the airline reward server (FIG. 10, steps 1000 and 1002). The process may continue to that described with respect to FIG. 6 for trading points into a reward exchange account (step 1004). In a similar manner, hyperlinks or calling routines may allow a user to access a reservations system or merchant from the trading server. The link would direct the user to partner or associated air carriers where the points in a user exchange account on the trading server 20 may be used to acquire hotel accommodations, special offers, reduced fare or free flights.

The system used to implement the aforementioned method will now be disclosed with respect to FIG. 5. The system is comprised of a trading server computer connected to a network of computers where a user interface is established whereby a user from a user computer may access the server to request the transaction to contact a reward server computer system. In the preferred embodiment, the server has memory means for storing the user account information, user profiles and rules which may be specified by the user, system, or merchant. The trading server also has communications means to allow users to access the server and to allow the trading server to contact reward servers and processing means to interpret the rules and coordinate the contact to the respective servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants and issuers.

In the preferred embodiment, the memory means comprises a database structure that is used to record the transactions associated with the previously described method. Records indicating the changes and current value of user exchange accounts are updated according to the request processed by the processor.

In response to a request for redemption, the trading server looks up the contact properties of the reward server to be contacted. The user information is submitted to the reward server to display the available points that may be redeemed.

In another embodiment, the request additionally contains a value to be redeemed. The processor establishes a communication link with the reward server and a transaction request is sent to the processor of the reward server. The processor of the reward server may perform actions that may allow or refuse the requested action, or suggest an alternative action. In another embodiment, the trading server processor may be granted direct authorization to modify the user's records in the reward server database without analysis by the processor of the reward server. A conversion rate may be applied to the transaction such that the reward server reduces the available rewards or value in the user's account. The reward server then transfers consideration to the trading server that corresponds to the value reduced or available in the reward system. In response to the receipt of the transfer or approval of the transfer, the trading server increments the user account balance to reflect the received consideration and the connection to the reward server is terminated. A transaction log may be used to record each of the transactions in case a reconciliation process is required at a later time. The new value, whether increased or decreased in the user's exchange account may then be stored until a user finds an item to be purchased.

The user selects the desired object from the merchants by indicating the type of product or service to be procured. In one embodiment, the trading server contacts the merchant server to return to the user a list of products that match the user's search criteria or if the user had specified in detail what was desired, the product may be directly acquired from a merchant or broker/dealer. A communication link is established between the trading server and the merchant computer or designee for e-commerce. Direct acquisition may be enacted by contacting the merchant or broker/dealer computer and supplying the user indicia, the product indicia, and the redemption value sufficient to secure the transaction. In response to the transaction request, the merchant computer or broker/dealer will receive the consideration supplied and contract for the delivery of the product. Unfulfilled requests are stored and when available can be pushed to the user. In another embodiment, the consideration required for the item selected is sent to the trading server where based on the available points in the user's exchange account the trading server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

In a situation wherein the user finds it necessary or desirable to return a product, such as when the product may be damaged, then provision is made for the restocking of points back into the user account (rather than a cash refund), with an optional restocking fee being charged to the user in the form of points.

Thus, the present invention provides a liability management system for issuers of reward points, which allows them to take points off the books and eliminate them, if desired, at a discounted rate. This system enables the sale or repurchase of points with a trading strategy in which points need not expire.

Other aspects of this invention will now be disclosed that will enhance the reader's understanding of the application of this invention.

The user can purchase points from the system, borrow points from the system, etc., and basically treat the points as cash consideration for purposes of such transactions.

The system can prioritize the order of points being traded based on a predetermined set of rules such as in higher value points being issued before those with a lower value.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected. There may be designations where a percentage of the product may be paid with points, with the rest in cash or cash equivalent.

It is anticipated that high quality limited access products may benefit from the distribution methods afforded by this system. For example, companies like SONY and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points or points plus a property timeshare or a percentage of cash. Rooms may be booked with discounts that vary in accordance with the number of rooms available, which can change in real time as per the changing availability of rooms.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets, airline departures, hotel room rentals and the like can have an associated diminishing or escalating value based on the length or availability of the offer. This invention may be used to provide hotel rooms such that when rooms are available and the date of use approaches, the rental price may decrease (the same methodologies may be used to sell advertising space that is time-sensitive).

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

Other purchasing leverage not specifically addressed previously may also be acquired by combining the power of a pool of users of this system where these users may be allocated access to products or services not generally distributed to the remainder of the system users. Points collected in the system by these users may afford them access to limited distribution channels where higher discount levels or premium products may be acquired. Direct access to cartel or special club products such as diamonds, bulk or price-advantaged products, duty free items and other restricted access product or service offerings are also accommodated through the coordination of the trading server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The trading server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the trading server system controls access to the offer. Parameters associated with the available quantity, duration, exchange rates, etc may be input into the system to be used in the allocation algorithm to restrict the offer. Upon user access, the trading server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games or other services (e.g. meals and drinks) may be afforded to the traveler where the availability of different games depends on the number of reward points traded in by the traveler. The rewards may be converted using the trading server of this invention, where the user may opt to forego collecting mileage in return for accessing on-board entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the trading server account login id and password, where the user may use points awarded from another air carrier or point server to "pay" for the services accessed. The account balance from the trading server may be transferred to the local controller prior to takeoff for each user that logs in to the trading server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use, certified against the passenger log.

In another aspect of the invention, an electronic bartering system is implemented, wherein product manufacturers, producers, distributors, etc. can provide surplus or overstocked goods for liquidation into the chain of supply of the system and exchange then for points as described herein. This provides an inventory management and liquidation system for these manufacturers and sellers.

In addition, the value of the reward points may fluctuate as a function of the company's performance, which may be measured by reference to the price of its stock, revenue, earnings, or some other parameter that is agreed to that reflects the relative performance of the company. In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the value of points otherwise earned by using its credit card. The value may also fluctuate as a function of the number of points outstanding or the desirability of the issuer to reduce its liability or make it more robust.

I claim:

1. A portable hand-held multi-function device comprising processing circuitry, program storage, and data memory; wherein the processing circuitry is programmed via instructions in the program storage to:
   store in the data memory a plurality of transaction applications and a plurality of reward accounts, each of said reward accounts being associated with one of the plurality of transaction applications,
   issue rewards in association with a transaction executed using a selected one of the plurality of transaction applications,
   store the issued rewards in the reward account associated with the transaction application selected for use with the transaction; and
   combine rewards previously stored in at least two of the plurality of the reward accounts towards purchase of an item.

2. The device of claim 1, wherein the transaction application selected for use with the transaction is a payment application for making payment in the transaction.

3. The device of claim 2 further comprising user input circuitry for allowing the selection of the transaction application for making payment in the transaction.

4. The device of claim 3 wherein the user input circuitry comprises a button for the selection of the transaction application for making payment in the transaction.

5. The device of claim 2, wherein the payment application selected for making payment in the transaction comprises a credit card application.

6. The device of claim 5, wherein selection of the credit card application enables payment to be made for the transaction with credit associated with the credit card application.

7. The device of claim 6, wherein rewards are added to the reward account associated with the credit card application selected for making payment in the transaction.

8. The device of claim 5, wherein selection of the credit card application enables payment to be made for the transaction with rewards previously stored in the reward account associated with the credit card application.

9. The device of claim 2, wherein the processing circuitry is further programmed to automatically select a first transaction account from the plurality of transaction applications for making payment in a transaction with a first type of merchant, and to automatically select a second transaction account from said plurality of transaction applications for making payment in a transaction with a second type of merchant.

10. A method of using a portable hand-held multi-function device comprising
   the portable hand-held multi-function device storing in a data memory of the portable hand-held multi-function device a plurality of transaction applications and a plurality of reward accounts, each of said reward accounts being associated with one of the plurality of transaction applications,
   the portable hand-held multi-function device issuing rewards in association with a transaction executed using a selected one of the plurality of transaction applications,
   the portable hand-held multi-function device storing the issued rewards in the reward account stored in the data memory of the portable hand-held multi-function device associated with the transaction application selected for use with the transaction, and
   the portable hand-held multi-function device combining rewards previously stored in at least two of the plurality of the reward accounts towards purchase of an item.

11. The method of claim 10, further comprising the portable hand-held multi-function device allowing selection of at least one of the plurality of transaction applications for making payment in a transaction.

12. The method of claim 11, further comprising operating user input circuitry on the device to select the at least one of said plurality of transaction applications for making payment in the transaction.

13. The method of claim 12 wherein the user input circuitry comprises a button for the user selection of the at least one of said plurality of transaction applications for making payment in the transaction.

14. The method of claim 11, further comprising the portable hand-held multi-function device allowing selection of a transaction application comprising a credit card application for making payment in the transaction.

15. The method of claim 14, wherein selection of the credit card application enables payment to be made for the transaction with credit associated with the credit card application.

16. The method of claim 15, further comprising the portable hand-held multi-function device adding rewards to the reward account associated with the credit card application selected for making payment in the transaction.

17. The method of claim 14, wherein selection of the credit card application enables payment to be made for the transaction with rewards previously stored in the reward account associated with the credit card application.

18. The method of claim 11, further comprising the portable hand-held multi-function device allowing automatic selection of a first transaction account from said plurality of transaction applications for making payment in a transaction with a first type of merchant, and the portable hand-held multi-function device allowing automatic selection of a second transaction account from said plurality of transaction applications for making payment in a transaction with a second type of merchant.

* * * * *